(12) United States Patent
Kauppila

(10) Patent No.: US 6,701,286 B2
(45) Date of Patent: Mar. 2, 2004

(54) METHOD FOR CONDITION MONITORING OF APPARATUSES

(75) Inventor: Jarmo Kauppila, Kajaani (FI)

(73) Assignee: Metso Automation Oy, Helsinki (FI)

( * ) Notice: Subject to any disclaimer, the term of this patent is extended or adjusted under 35 U.S.C. 154(b) by 0 days.

(21) Appl. No.: 10/040,881

(22) Filed: Jan. 7, 2002

(65) Prior Publication Data

US 2002/0111774 A1 Aug. 15, 2002

Related U.S. Application Data

(63) Continuation of application No. PCT/FI00/00626, filed on Jul. 6, 2000, now abandoned.

(30) Foreign Application Priority Data

Jul. 7, 1999 (FI) .................................................. 991559

(51) Int. Cl.$^7$ ............................................. G01H 11/00
(52) U.S. Cl. ........................ 702/188; 702/56; 702/183; 702/185; 73/660
(58) Field of Search .............................. 702/188, 33–36, 702/39, 42, 50, 54, 56, 76–79, 113–115, 124–126, 130, 136, 138, 140, 142, 145–148, 177, 182–185, 187, 189, FOR 150, FOR 154, FOR 168, FOR 170, FOR 171, FOR 123–FOR 126, FOR 134, FOR 135, FOR 136, FOR 142, FOR 143; 340/679–683; 73/570, 579, 593, 602, 659, 660; 700/275, 278–280, 299–301, 304, 306, 127–129; 162/198, 199, 252, 262, 265, DIG. 10, DIG. 11

(56) References Cited

U.S. PATENT DOCUMENTS

| | | | |
|---|---|---|---|
| 4,550,603 A | 11/1985 | Fukada et al. ................. | 73/587 |
| 4,550,604 A | 11/1985 | Sugimoto et al. ............. | 73/587 |
| 4,649,743 A | 3/1987 | Sugimoto et al. ............. | 73/162 |
| 5,109,700 A | 5/1992 | Hicho .......................... | 73/660 |
| 5,223,207 A * | 6/1993 | Gross et al. ................. | 376/216 |
| 5,445,028 A * | 8/1995 | Bianchi et al. ............... | 73/660 |
| 5,596,496 A | 1/1997 | Loeffler ....................... | 701/29 |
| 5,679,900 A * | 10/1997 | Smulders ...................... | 702/35 |
| 5,745,382 A | 4/1998 | Vilim et al. .................. | 706/16 |
| 5,875,420 A | 2/1999 | Piety et al. ................. | 702/182 |
| 6,199,019 B1 | 3/2001 | Iino et al. ..................... | 702/35 |
| 6,260,004 B1 * | 7/2001 | Hays et al. ................... | 702/34 |

FOREIGN PATENT DOCUMENTS

| | | | |
|---|---|---|---|
| WO | WO 98/27275 | * | 6/1998 |
| WO | WO 99/20836 | * | 4/1999 |
| WO | WO 01/04597 | * | 1/2001 |

* cited by examiner

Primary Examiner—Hal Wachsman
(74) Attorney, Agent, or Firm—Alston & Bird

(57) ABSTRACT

A method of monitoring the condition of apparatuses wherein the condition of the apparatus is measured from one or more rotating objects by means of a fixedly mounted condition monitoring system during the operation of the apparatus when it operates at its normal operating speed. In the method, at least one signal indicating the condition of the apparatus and the steadiness of the operation is measured during the change in the operating speed of the apparatus and desired characteristic values and/or functions are calculated from each signal measured in this manner as a function of measured time and/or rotational speed.

6 Claims, 2 Drawing Sheets

METHOD FOR CONDITION MONITORING OF APPARATUSES

CROSS-REFERENCE TO RELATED APPLICATION

This application is a continuation of International Patent Application PCT/FI00/00626 filed Jul. 6, 2000, now abandoned which designated the United States and was published under PCT Article 21(2) in English.

FIELD OF THE INVENTION

The invention relates to a method of monitoring the condition of apparatuses wherein a signal indicating the condition of the apparatus and the steadiness of the operation is measured from one or more rotating objects or components of the apparatus by using a fixedly mounted condition monitoring system during normal operation of the apparatus when it operates at its normal operating speed, and desired characteristic values and characteristic functions are calculated from each measured signal to detect variations deviating from the normal operation that may indicate potential malfunction.

BACKGROUND OF THE INVENTION

To monitor the condition of various machines and to anticipate fouling for the purpose of maintenance, signals are measured from the monitored objects using various sensors, and from these signals different frequency spectra and characteristic values, regarded as indicating the condition of the monitored object, are calculated. In the above described condition monitoring, vibration transducers are typically used for producing a signal indicating the condition of the machine and the steadiness of the operation. In addition to or instead of measuring vibration, pressure, temperature or some other variable can also be measured, if required.

Typically the monitoring is performed by measuring a signal for a certain length of time at regular intervals and by calculating the required calculations from each measured signal. For example, a signal can be measured for a duration of ten seconds from each monitored object, and this measurement can be performed once an hour. Certain threshold values can be determined for the values that are to be calculated, and the exceeding of the threshold values causes an alarm such that the component that is about to break down can be replaced by a new one during the next stoppage, before the actual defect in the monitored object causes more damage or additional stoppages.

Such condition monitoring can be used efficiently in an apparatus where the speed of rotating components remains substantially constant, such that it is easy to detect the deviations. In this way, for example, bearings of the elements rotating typically at a constant or substantially constant speed can thus be measured and monitored efficiently. However, in a situation where transient operation of the apparatus may frequently occur during which the speed may change significantly, such as during the start-up stage of the apparatus wherein the speed or rotational frequency changes substantially in a short time, the use of such a condition monitoring system provides no substantial benefit nor can the monitoring be performed with current condition monitoring systems. As the steadiness of the operation of a rotating machine component may depend on the speed or the rotational frequency, it is not possible to measure defects appearing this way under normal conditions.

SUMMARY OF THE INVENTION

It is an object of this invention to provide such a method by which the condition of a machine can be monitored not only during normal steady operation but also under transient operating conditions in which the operating speed is not constant. In accordance with the invention, during transient operation when the apparatus does not operate at a constant operating speed, at least one signal indicating the condition of the apparatus and the steadiness of the operation is measured from one or more of the components of the apparatus and characteristic values and characteristic functions are calculated from each signal as a function of measured time and/or measured rotational speed of the object.

The essential idea of the invention is that when the operating conditions of the machine change during the start-up, for instance, the signal indicating the condition of the monitored object or component is measured during the speed change and/or during the time the speed is different than the normal, substantially constant operating speed, and the measurement results are analyzed such that the desired characteristic values and characteristic functions are calculated as a function of time according to the situation or as a function of rotational frequency or speed of the measured object. According to a preferred embodiment of the invention, a vibrational spectrum, for instance, is calculated as a power spectrum of a signal as a function of time, rotational frequency, or speed. According to another preferred embodiment of the invention, in such a situation, condition monitoring signals of all typically monitored objects are simultaneously measured, whereby the signals can be compared with each other, and it can thus be determined from which object a certain disturbance originates and this can be taken into consideration in the case of the respective object. Using the method according to the invention, it is possible to monitor the object and detect signal spectrum deviations, such as strong resonance vibrations, occurring at a specific time during the stage of the speed change, whereby, on the one hand, it is possible to detect such distinct disturbances that only appear at certain abnormal operating speeds and further to monitor potential changes that could indicate a risk of malfunction. In this case, operating failures that are clearly due to certain components can be taken into account as a function of rotational speed, for example, whereby separate threshold values that deviate from other alarm limits can be set for such components such that they do not cause any unnecessary alarms if the operating speed of the machine temporarily gets into this operating range.

BRIEF DESCRIPTION OF THE DRAWINGS

The invention will be described in greater detail in the attached drawings, in which vibrations measured in connection with the start-up of a winder of a paper machine are schematically shown as a function of rotational speed, and wherein.

DETAILED DESCRIPTION OF PREFERRED EMBODIMENTS

Figure 1:
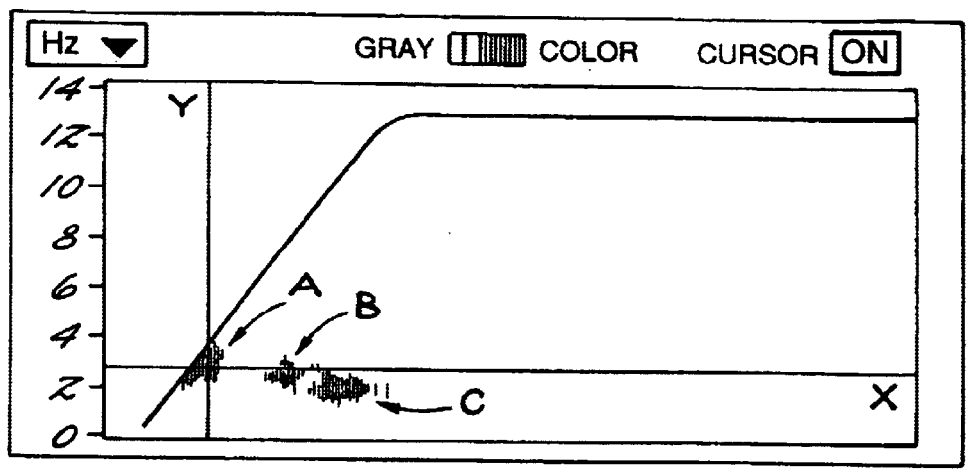
FIG. 1 schematically shows a curve of the rotational speed of a winder belt roll as a function of time, and vibration peaks in a spectrogram, FIG. 2 schematically shows a vibration signal measured during the start-up as a function of time, FIG. 3 schematically shows a power spectrum obtained at the moment indicated by line Y of FIG. 1.

FIG. 1 schematically illustrates as a function of time the rotational speed of a roll monitored by a condition monitoring system in a paper machine winder during a start-up of the winder, in which the plotted curve indicates the speed of the winder. Lines X and Y represent the horizontal and vertical axes, and letters A to C denote vibration peaks in the spectrogram as a result of the measurement.

Figure 2:
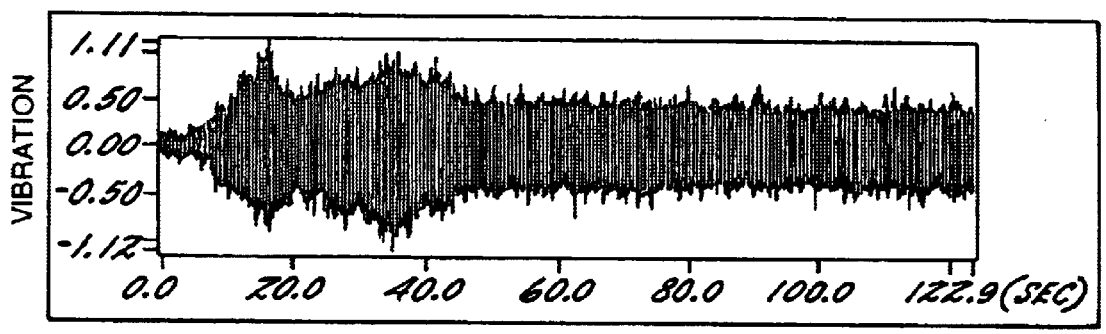

FIG. 2, in turn, shows a vibration signal measured during the start-up of the winder as a function of time in the scale corresponding to the time axis of FIG. 1. As apparent from the figure, at the place where the vibration peaks marked in FIG. 1 can be seen in the spectrogram, corresponding vibration also occurs in the continuous vibration signal. Thus, at the place corresponding to the line Y of FIG. 1, a clear vibration peak can be seen about 15.5 seconds after the start-up of the paper winder, at which time the rotational speed is about 3.5 Hz.

Figure 3:
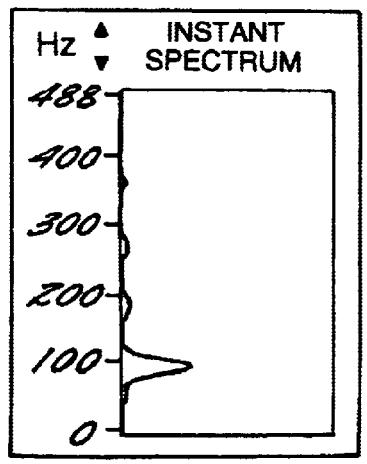

FIG. 3, in turn, shows a vibrational spectrum according to FIGS. 1 and 2 at the time corresponding to the line Y, in which spectrum a vibration peak can be seen at a frequency of about 98 Hz. The vibration peaks B and C can be analyzed in a corresponding manner, whereby vibration disturbances as well as their frequencies and strengths can be analyzed at certain speeds of rotation of a paper winder during its start-up. By thus measuring the entire start-up stage and defining the signal strength limits, operating failures of the machine can be examined and analyzed under varying conditions, and by using this information, the condition of the machine can be monitored at operating speeds outside the normal operating speed. This can be done by measuring condition monitoring signals under varying conditions and by analyzing them either as a function of time or as a function of rotational speed of the object to be measured. To perform the actual analysis, techniques known per se, generally called JTFA (Joint Time Frequency Analysis) techniques, can be employed. These methods are characterized in that they describe the power division of the measured signal in the time-frequency domain. In a conventional spectrum analysis, a spectrum indicating the average distribution of power on the frequency axis is calculated from a signal. Instead, by means of the JTFA, a spectrogram can be formed, illustrating the time dependence of a power spectrum. Generally used JTFA techniques include, e.g., STFT (Short Time Fourier Transform) and a wavelet transform. The work Shie Qian, Dapang Chen: Joint Time Frequency Analysis, Prentice Hall 1996, for example, is referred to as representing the prior art. By means of the JTFA, the changing of the power spectrum of vibration signals, for example, can be observed as a function of time or rotational speed, whereby a new apparatus can perform for example a basic analysis, with which later measurements are compared in order to find out whether potential condition monitoring and maintenance are required.

When an apparatus is analyzed for example during its start-up or after a maintenance stoppage, a thorough basic analysis can be done for it by simultaneously measuring the condition monitoring signals of all or of at least the most important monitored objects. Once the necessary calculations have been done from them and the desired graphs have been formed as a function of time or alternatively as a function of rotational speed of each component, the results associated with the same time scale can also be compared with each other, and the actual reason for various disturbances and its influence on other monitored objects can be detected. Correspondingly, different disturbing frequency values of the monitored objects and the amplitude threshold values of the variations in the disturbing frequencies can be dimensioned in this manner to be suitable for the condition monitoring. Since the disturbance levels change after the replacement of a component, the basic analysis should be done at least after the replacement of significant components. In addition to mechanical condition monitoring, this method can be applied to the monitoring of the operation of a paper machine and particularly to the measurement of rapid quality variations in the machine direction and to the detection of disturbance sources. When conventional on-line quality indicators are used for measuring on-line properties of paper, the machine direction analyses performed with the signal obtained from the on-line quality indicators are disturbed by the indicator moving constantly in the transverse direction of the paper web. Thus, certain local disturbances in the machine direction that occur in a narrow area do not appear if the spectrum is calculated from the signal that is obtained during the entire transverse movement. By using JTFA methods it is possible to calculate a spectrogram indicating the place dependence of the spectrum, in a corresponding manner as the spectrogram in the vibration analysis of a machine start-up indicates the dependence between time and rotational speed of the vibrational spectrum. Similarly the condition of paper machine fabrics can be analyzed by calculating a spectrogram from the signal indicating the condition of the fabric during the time it passes through a circuit. The spectrogram illustrates the changes of the spectrum during the circuit of the fabric, whereby local defects in the fabric can also be detected from the spectrogram. As an example of this, the analysis of the condition of a press felt can be mentioned, which is done on the basis of a spectrogram illustrating nip vibration and calculated from a vibration signal that is measured during one circuit of the felt.

Figure 4:
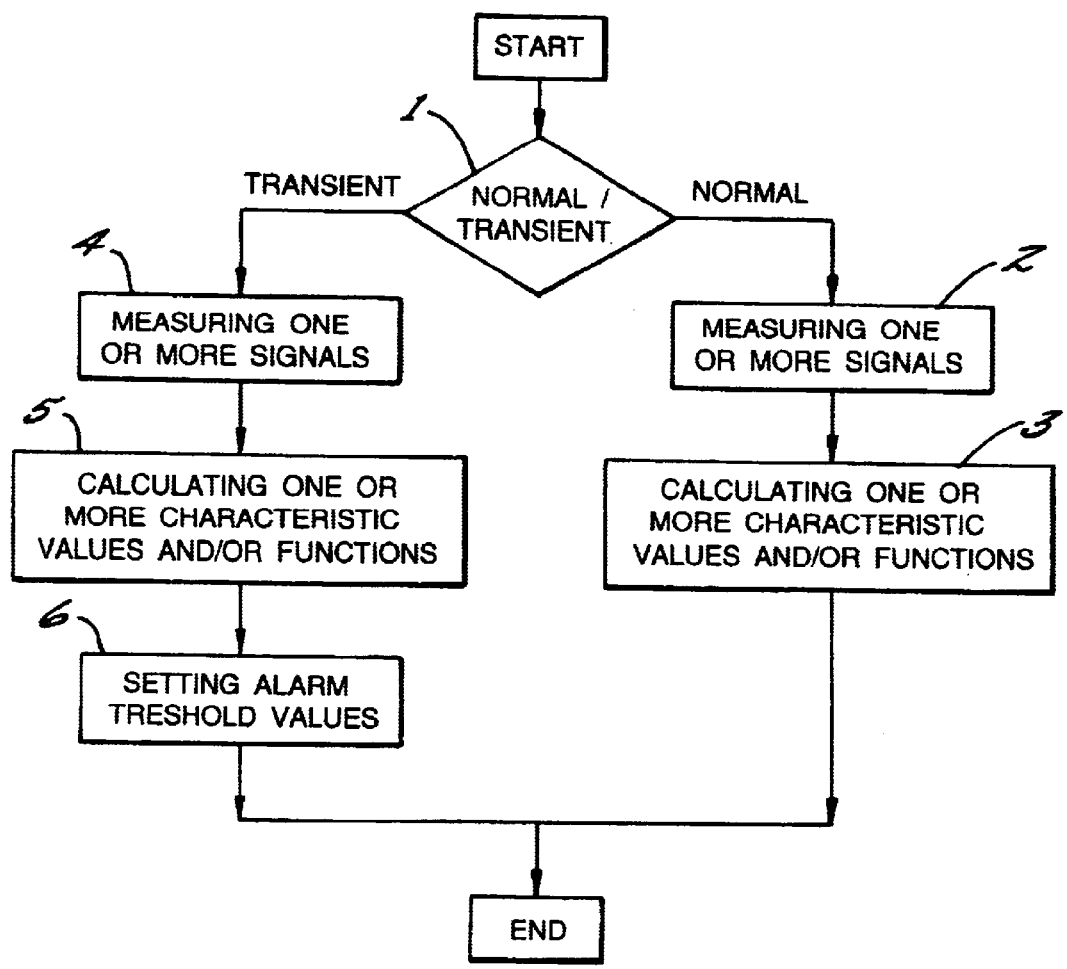
FIG. 4 is a flow chart illustrating steps of a process in accordance with one embodiment of the invention.

FIG. 4 depicts a method in accordance with one embodiment of the invention in flow chart form. During normal operation (see the right-hand branch from decision block 1), the method entails measuring a signal indicating a condition of the industrial apparatus from at least one rotating component of the apparatus by using a fixedly mounted condition monitoring system during the operation of the industrial apparatus at the normal operating speed, as indicated at block 2. The method further involves calculating characteristic values and characteristic functions from said measured signal to detect variations deviating from normal operation that may indicate potential malfunction, as indicated at block 3. During transient operation (left-hand branch from decision block 1) while a change in operating speed of the industrial apparatus takes place such that the industrial apparatus does not operate at a constant operating speed, at least one signal indicating the condition of the industrial apparatus is measured from at least one component of the industrial apparatus as indicated at block 4. Next, the characteristic values and characteristic functions are calculated from said at least one signal as a function of at least one of a measured time and a measured rotational speed of the at least one component, as indicated at block 5. The method advantageously also includes the step of setting alarm threshold values for at least some of the components on the basis of the calculated characteristic values and characteristic functions therefor, as indicated at block 6.

The invention has been described above in the specification and the drawing only by way of example and it is not restricted thereto in any way. The invention is applicable to apparatuses in which condition monitoring is performed during normal operation by measuring typically at suitable intervals a signal, most typically a vibration signal, indicating the condition of the apparatus from monitored objects, which signal is then analyzed by calculating different vibrational spectra and vibration functions from it in order to detect resonance peaks and deviations, for instance, and thus to detect components that are about to break down before they actually do break down. It is essential that the measurement is performed with operating speeds deviating from the constant operating condition during the speed change, possibly during the entire change, so that thereby occurring disturbances can be taken into account in the condition monitoring. The invention can particularly be applied in machines and apparatuses of the paper industry, such as winders, supercalenders, and coating heads, as well as in speed tests performed by a press section of a paper machine, in power stations, in turbines, and in similar apparatuses which usually operate substantially at constant speed, but in which, however, significant operating speed changes occur in a short time, due to different starting and stopping situations. Pressure can be used as a condition monitoring signal for example in a different hydraulics, whereby hydraulics pressures also otherwise monitored in a normal manner are preferably used as measurement objects. Pressure can similarly be used as a condition monitoring signal for example by measuring pulp pressure fluctuations in pulp transfer pipes in the pulp section of a paper factory.

What is claimed is:

1. A method of monitoring the condition of an industrial apparatus having a rotating component that operates during steady-state operation at a normal operating speed that is substantially constant, the method comprising:

operating the industrial apparatus transiently during a start-up wherein a speed of the rotating component changes with time and increases up to the normal operating speed, during the start-up measuring the speed of the rotating component and measuring a signal indicating a condition of the rotating component by using a fixedly mounted condition monitoring system, performing a joint time frequency analysis of said measured signal to produce a spectrum of said measured signal as a function of speed of the rotating component, and based on said spectrum setting alarm threshold limits which if exceeded indicate potential malfunction of the rotating component, wherein the alarm threshold limits are a function of speed of the rotating component;

during steady-state operation, measuring a signal indicating the condition of the rotating component by using the fixedly mounted condition monitoring system, performing a joint time frequency analysis of said measured signal to produce a spectrum of said measured signal, and analyzing the spectrum to detect variations deviating from normal operation that indicate potential malfunction; and during transient operation while a change in operating speed of the rotating component takes place such that the rotating component does not operate at a constant operating speed, measuring a signal indicating the condition of the rotating component of the industrial apparatus, performing a joint time frequency analysis of said measured signal to produce a spectrum of said measured signal as a function of speed of the rotating component, and based on the alarm threshold limits detecting variations from normal operation that indicate potential malfunction.

2. The method as claimed in claim 1, wherein during transient operation signals are measured simultaneously from a plurality of rotating components of the apparatus and a joint time frequency analysis is performed for each said signal.

3. The method as claimed in claim 2, wherein during transient operation signals are measured simultaneously from at least all components that are monitored during normal operation.

4. The method as claimed in claim 2, wherein the joint time frequency analyses for said plurality of components are arranged to the same scale proportional to the measurement time to enable mutual comparison.

5. The method as claimed in claim 1, wherein a plurality of components are monitored with a fixedly mounted condition monitoring system in a paper machine.

6. The method as claimed in claim 1, wherein a vibration of the rotating component is measured and a resulting vibration signal is used when performing the joint time frequency analysis.

* * * * *